(12) United States Patent
Ahmed

(10) Patent No.: US 9,619,144 B2
(45) Date of Patent: Apr. 11, 2017

(54) INTERRUPT DRIVEN PROCESSING AND RELATED DEVICES, METHODS AND SYSTEMS

(71) Applicant: Firoz Ahmed, Gilbert, AZ (US)

(72) Inventor: Firoz Ahmed, Gilbert, AZ (US)

(73) Assignee: NXP USA, INC., Austin, TX (US)

( * ) Notice: Subject to any disclaimer, the term of this patent is extended or adjusted under 35 U.S.C. 154(b) by 540 days.

(21) Appl. No.: 14/087,068

(22) Filed: Nov. 22, 2013

(65) Prior Publication Data

US 2015/0149121 A1    May 28, 2015

(51) Int. Cl.
*G06F 3/06* (2006.01)
*G01D 3/036* (2006.01)
*G01P 15/18* (2013.01)
*G01P 21/00* (2006.01)

(52) U.S. Cl.
CPC ............... *G06F 3/06* (2013.01); *G01D 3/036* (2013.01); *G01P 15/18* (2013.01); *G01P 21/00* (2013.01)

(58) Field of Classification Search
CPC . G06F 3/06; G01P 15/14; G01P 15/18; G01P 21/00; G01D 3/036
See application file for complete search history.

(56) References Cited

U.S. PATENT DOCUMENTS 4,675,820 A * 6/1987 Smith .................... G01C 21/16
701/501

OTHER PUBLICATIONS

Rodriguez-Martin et al., A Wearable Inertial Measurement Unit for Long-Term Monitoring in the Dependency Care Area, Oct. 18, 2013, Sensor 2013, pp. 14079-14104.*

* cited by examiner

*Primary Examiner* — Toan Le

(57) ABSTRACT

Devices, methods and systems are provided for processing measurement data. An exemplary device includes a first module to provide data and an interrupt, a control module coupled to the first module to obtain the data from the first module and provide an indication after obtaining the data, and an interrupt control module coupled to the first module and the control module to notify the first module to clear the interrupt in response to the indication from the control module.

18 Claims, 3 Drawing Sheets

US 9,619,144 B2

INTERRUPT DRIVEN PROCESSING AND RELATED DEVICES, METHODS AND SYSTEMS

TECHNICAL FIELD

Embodiments of the subject matter described herein relate generally to signal processing, and more particularly, embodiments of the subject matter relate to electronic devices for processing sensor data from sensing arrangements having independent sampling frequencies.

BACKGROUND

Sensors are used in a variety of applications. For example, an automobile may include one or more accelerometers and/or gyroscopic sensors configured to support stability and/or traction control, along with one or more temperature sensors to provide temperature compensation for the output of the accelerometers and/or gyroscopic sensors or to monitor temperatures at various locations within the vehicle. In practice, processing the sensor data to achieve the desired performance requirements using general purpose processing devices often involves complex sets of instructions, which may require higher clock frequencies and increased power and/or area consumption to reduce latencies. Accordingly, it is desirable to minimize latencies and reduce power and/or area consumption without compromising performance.

BRIEF DESCRIPTION OF THE DRAWINGS

The various embodiments will hereinafter be described in conjunction with the following drawing figures, which are not necessarily drawn to scale, wherein like numerals denote like elements, and wherein.

DETAILED DESCRIPTION

Figure 1:
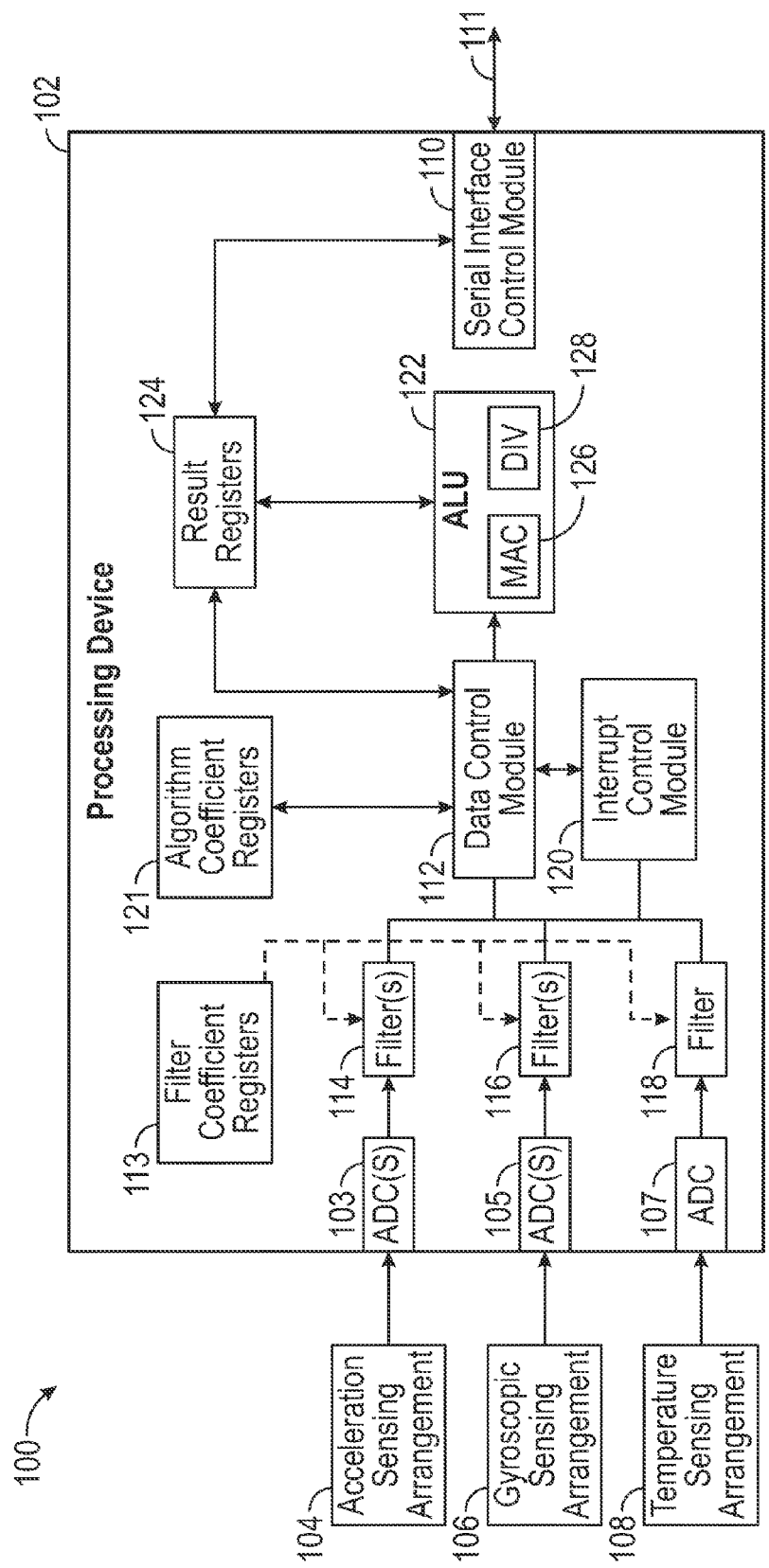
FIG. 1 is a block diagram of a signal processing system in accordance with one embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Embodiments of the subject matter described herein relate to signal processing systems and methods that include a processing device that processes the outputs of multiple different sensing arrangements with independent and/or different sampling frequencies to obtain measurements corresponding to the outputs of the sensing arrangements that are compensated (e.g., for temperature fluctuations), scaled for the appropriate signal range, and have the desired signal-to-noise ratio (SNR). For purposes of explanation, but without limitation, the resulting measurement values output by the processing device may alternatively be referred to herein as calibrated measurement values (or simply, calibrated measurements). In exemplary embodiments, the processing device includes filtering modules that perform decimation filtering to obtain filtered measurement data based on the output data from the sensing arrangements. After a respective filtering module obtains a filtered measurement data value, the respective filtering module generates an interrupt request that indicates the availability of a new filtered measurement data value to be processed. The processing device includes a data control module responsible for servicing the interrupt requests along with an interrupt control module coupled to the data control module and the filtering modules to ensure that the interrupt requests are serviced. In this regard, when the interrupt control module determines the data control module is available to service the interrupt request, the interrupt control module instructs or otherwise notifies the data control module of the respective filtering module to be serviced. Otherwise, when the data control module is unavailable to service the interrupt request, the interrupt control module buffers or otherwise maintains the interrupt request until the data control module is subsequently available to service another interrupt request. Thereafter, when the interrupt control module receives or otherwise identifies an indication from the data control module that the data control module is available to service another interrupt request, the interrupt control module identifies a buffered interrupt request to be serviced and instructs or otherwise notifies the data control module of the respective filtering module associated with the identified buffered interrupt request. In this manner, the interrupt control module ensures that interrupt requests generated while the data control module is busy servicing another interrupt request are eventually serviced by the data control module once the data control module is available.

In response to receiving an instruction or notification to service an interrupt request from a particular filtering module, the data control module obtains the filtered measurement data value from the identified filtering module and initiates further processing of the filtered measurement data value. In exemplary embodiments, the data control module obtains processing algorithm coefficients associated with the particular sensing arrangement and/or sensed characteristic associated with the sensor measurement data value that the filtered measurement data value is based upon, and provides the processing algorithm coefficients and the filtered measurement data value to an arithmetic logic unit (ALU), which, in turn, determines a calibrated measurement data value for the sensed characteristic based at least in part on the processing algorithm coefficients and the filtered measurement data value. In some embodiments, the calibrated measurement data value is stored in a register accessible by the data control module, where the data control module obtains the calibrated measurement data value for the sensed characteristic and provides the calibrated measurement data value to the ALU along with the processing algorithm coefficients and the filtered measurement data value. In this regard, the ALU may determine an updated calibrated measurement data value based on the recently obtained filtered measurement data value, the previously-determined calibrated measurement data value, and the processing algorithm coefficients.

In exemplary embodiments, after the data control module provides a filtered measurement value obtained from a respective filtering module to the ALU, the data control module generates or otherwise provides an indication or notification to the interrupt control module that the interrupt request associated with the respective filtering module has been serviced. In response to identifying the indication that an interrupt request has been serviced, the interrupt control module notifies or otherwise instructs the filtering module to clear the interrupt request. If the interrupt request was previously buffered by the interrupt control module, the interrupt control module may discard or otherwise remove the interrupt request from the buffered interrupt requests in response to the indication from the data control module. Additionally, in response to the indication, the interrupt control module may determine that the data control module is available to service a buffered interrupt request, select or otherwise identify a buffered interrupt request for servicing, and instruct or otherwise notify the data control module to service the buffered interrupt request. In response, the data control module services the buffered interrupt request by obtaining the filtered measurement value from the identified filtering module, providing the filtered measurement value to the ALU for further processing, and notifying the interrupt control module after servicing the interrupt request in a similar manner as described above.

Turning now to FIG. 1, an exemplary signal processing system 100 includes, without limitation, a processing device 102 and a plurality of sensing arrangements 104, 106, 108. The processing device 102 is coupled to the sensing arrangements 104, 106, 108 to receive output data indicative of the characteristic that is sensed, measured, or otherwise quantified by a respective sensing arrangement 104, 106, 108. The processing device 102 is configured to calculate or otherwise determine calibrated measurement data based on the sensor output data, and transmit or otherwise output the calibrated measurement data via a serial interface 111 coupled to the processing device 102, as described in greater detail below. It should be understood that FIG. 1 is a simplified diagram of the signal processing system 100 for purposes of explanation, and FIG. 1 is not intended to limit the scope of the subject matter in any way.

In the illustrated embodiment of FIG. 1, the processing device 102 includes sampling arrangements 103, 105, 107, such as analog-to-digital converters (ADCs), coupled to the outputs of the respective sensing arrangements 104, 106, 108 to convert output data signals indicative of characteristics sensed by the respective sensing arrangements 104, 106, 108 into corresponding digital measurement data values. In exemplary embodiments, the sampling frequencies of the sampling arrangements 103, 105, 107 associated with the sensing arrangements 104, 106, 108 are independent from one another, such that the measurement data values based on the output from one sensing arrangement 104, 106, 108 may have a frequency (or rate) that is different from the measurement data values associated with the other sensing arrangements 104, 106, 108. For example, in one or more exemplary embodiments, the first sensing arrangement 104 is realized as an acceleration sensing arrangement (or accelerometer) that generates or otherwise outputs electrical signals indicative of the strength and direction of an acceleration that is sensed, measured, or otherwise quantified by the acceleration sampling arrangement 103 at a first sampling frequency (or rate) in the range of about 100 kilohertz (kHz) to about 210 kHz, while the second sensing arrangement 106 is realized as a gyroscopic sensing arrangement (or gyroscope) that generates or otherwise outputs electrical signals indicative of a current orientation that is sensed, measured, or otherwise quantified by the gyroscopic sampling arrangement 105 at a second sampling frequency (or rate) in the range of about 55 kHz to about 110 kHz.

In one or more exemplary embodiments, the acceleration sensing arrangement 104 is realized as a 3-axis microelectromechanical system (MEMS) accelerometer that generates three output signals indicative of the sensed acceleration along three independent axes, and the gyroscopic sensing arrangement 106 is realized as a 3-axis MEMS gyroscope that generates three output signals indicative of the sensed orientation with respect to three different independent axes. In this regard, the analog output signal for each respective axis of each respective sensing arrangement 104, 106 may have a corresponding sampling arrangement 103, 105 associated therewith that samples that analog output signal at the sampling frequency of the respective sensing arrangement 104, 106 to convert the respective analog output signal to a corresponding digital measurement value indicative of the sensed characteristic along that respective axis for that respective sensing arrangement 104, 106. For example, a first instance of sampling arrangement 103 may convert the analog output signal from the acceleration sensing arrangement 104 that is indicative of the x-axis acceleration to a corresponding x-axis acceleration measurement value, a second instance of sampling arrangement 103 may convert the analog output signal from the acceleration sensing arrangement 104 that is indicative of the y-axis acceleration to a corresponding y-axis acceleration measurement value, and so on. Depending on the embodiment, the acceleration sensing arrangement 104 and the gyroscopic sensing arrangement 106 may be fabricated on a common substrate (or die) of semiconductor material or on separate substrates (or dies). When fabricated on separate dies, the MEMS accelerometer die and the MEMS gyroscope die may be stacked or otherwise mounted to one another in a manner that reduces the total footprint consumed by the sensing arrangements 104, 106.

In the illustrated embodiment, the signal processing system 100 also includes a temperature sensing arrangement 108 that generates or otherwise provides output indicative of a sensed temperature. For example, the temperature sensing arrangement 108 may be realized as a diode that is forward biased with a constant and temperature independent bias current, wherein an output voltage signal obtained from a node and/or terminal of the diode is indicative of the voltage across the diode, which, in turn, is indicative of the ambient temperature. Other types of temperature sensing devices alternatively may be used. As described in greater detail below, the sensed temperature measurements obtained via the temperature sensing arrangement 108 are used to provide temperature compensation for the measurement values obtained via the other sensing arrangements 104, 106 using the trim coefficients associated with those respective sensing arrangements 104, 106. Depending on the embodiment, the temperature sensing arrangement 108 may be fabricated on a common die with one or more of the sensing arrangements 104, 106 or on a separate die, which also may be stacked or otherwise mounted to another die in a manner that reduces the total footprint consumed by the sensing arrangements 104, 106, 108. In a similar manner as described above in the context of the sensing arrangements 104, 106, a sampling arrangement 107 samples the output voltage signal generated by the temperature sensing arrangement 108 and converts the sampled voltage to a digital value representative of the temperature sensed (or measured) by the temperature sensing arrangement 108 at a particular sampling frequency (or rate). In one or more embodiments, the sampling frequency associated with the temperature sensing arrangement 108 is equal to the greatest sampling frequency of the other sensing arrangements 104, 106. In other embodiments, the sampling frequency associated with the temperature sensing arrangement 108 different from the sampling frequencies of the other sensing arrangements 104, 106.

Still referring to FIG. 1, in exemplary embodiments, the processing device 102 includes, without limitation, a data control module 112, a plurality of filtering modules 114, 116, 118 associated with the sensing arrangements 104, 106, 108, and an interrupt control module 120 coupled to the data control module 112 and the filtering modules 114, 116, 118. Each respective filtering module 114, 116, 118 applies one or more digital filters to a respective sensor output from a respective sensing arrangement 104, 106, 108 in a manner that is influenced by corresponding filter coefficients stored or otherwise maintained by a filter coefficient storage element 113 to obtain filtered sensor output data. For example, the filter coefficient storage element 113 may be realized as a plurality of registers, with each register storing one or more filter coefficients associated with one or more of the filtering modules 114, 116, 118. In other embodiments, the filter coefficient storage element 113 may be implemented as random access memory (RAM), read only memory (ROM), or some other type of storage. A first filtering module 114 associated with the x-axis output from the acceleration sensing arrangement 104 may apply a filter to the x-axis acceleration measurement values from the x-axis accelerometer sampling arrangement 103 using filter coefficients maintained in the filter coefficient register(s) 113 associated with the x-axis acceleration to obtain filtered x-axis acceleration measurement data values, while a second filtering module 114 associated with the y-axis output from the acceleration sensing arrangement 104 may apply another filter to the y-axis acceleration measurement values from the y-axis accelerometer sampling arrangement 103 using filter coefficients maintained in the filter coefficient register(s) 113 associated with the y-axis acceleration to obtain filtered y-axis acceleration measurement data values, and so on. In this regard, the characteristics of a respective filtering module 114, 116, 118 are programmable or otherwise configurable by changing its associated filter coefficient values that are maintained in its associated filter coefficient register(s) 113. In exemplary embodiments, the filtering modules 114, 116, 118 are configured to provide decimation filtering to the sensor measurement data values by implementing a sinc filter. For example, the accelerometer x-axis filtering module 114 may implement a cascaded integrator-comb sinc filter, where the order and the decimation ratio of the cascaded integrator-comb sinc filter are dictated by the values stored in the filter coefficient register(s) 113 associated with the accelerometer x-axis filtering module 114.

In exemplary embodiments, upon determining a new filtered measurement data value, each filtering module 114, 116, 118 generates or otherwise provides an interrupt request or another notification to the data control module 112 and/or the interrupt control module 120, where the interrupt request or notification indicates that a new filtered measurement data value is available. As described in greater detail below, the data control module 112 is coupled to outputs of the filtering modules 114, 116, 118 to obtain the filtered measurement data values from the filtering modules 114, 116, 118, and after obtaining a filtered measurement data value and servicing the interrupt request from a respective filtering module 114, 116, 118, that data control module 112 generates or otherwise provides an indication to the interrupt control module 120 that the filtered measurement data value from a respective filtering module 114, 116, 118 has been obtained or otherwise serviced. In response to receiving the indication from the data control module 112, the interrupt control module 120 provides an indication to the respective filtering module 114, 116, 118 to clear the interrupt request. For example, a first filtering module 114 associated with the x-axis output from acceleration sensing arrangement 104 may generate an interrupt request when a new filtered x-axis acceleration measurement data value is available by changing an output bit associated with interrupt requests (e.g., the interrupt bit) from a first state (e.g., logic '0' or a logical low voltage signal) to a second state indicative of an interrupt request (e.g., logic '1' or a logical high voltage signal). After obtaining the filtered x-axis acceleration measurement data value from the filtering module 114 associated with the x-axis accelerometer output and servicing the interrupt, the data control module 112 provides an indication to the interrupt control module 120 that the filtered x-axis acceleration measurement data value has been obtained. In response to receiving the indication from the data control module 112, the interrupt control module 120 provides an indication to the x-axis acceleration filtering module 114 to clear the interrupt request (e.g., to reset the interrupt bit to the first state).

In exemplary embodiments, the operating frequencies of the filtering modules 114, 116, 118 correspond to or are otherwise influenced by the sampling frequencies of their associated sampling arrangements 103, 105, 107. For example, the filtering modules 114 associated with the 3-axis acceleration outputs from the acceleration sensing arrangement 104 may output filtered measurement data values having a frequency (or data rate) substantially equal to the sampling rate of the sampling frequency of the acceleration sensing arrangement 104 and/or acceleration sampling arrangements 103, while the filtering modules 116 associated with the 3-axis gyroscope outputs from the gyroscopic sensing arrangement 106 output filtered measurement data values having a frequency (or data rate) substantially equal to the sampling rate of the sampling frequency of the gyroscopic sensing arrangement 106 and/or gyroscope sampling arrangements 105. Thus, the filtering modules 114, 116, 118 may generate interrupt requests and corresponding measurement data values at different frequencies and independently of one another, and may generate interrupt requests concurrently. Accordingly, as described in greater detail below, when the data control module 112 is unavailable to service an interrupt request generated by a particular filtering module 114, 116, 118, the interrupt request and the corresponding filtered measurement data value may be buffered or otherwise maintained until the data control module 112 is available to service the interrupt and obtain the filtered measurement data value. In this regard, the filtering modules 114, 116, 118 may include a buffer capable of storing one or more filtered measurement data values until the data control module 112 is available to service those interrupt requests.

The data control module 112 generally represents the hardware, circuitry, logic and/or other components of the processing device 102 that are configured to service interrupt requests by obtaining data from the filtering modules 114, 116, 118, generate indications or notifications that interrupt requests have been serviced, and perform additional operations, tasks, functions and/or processes described in greater detail below. The data control module 112 may be implemented with or realized as a processing core, a microcontroller, a microprocessor, a content addressable memory, an application specific integrated circuit, a field programmable gate array, any suitable programmable logic device, discrete gate or transistor logic, discrete hardware components, or any combination thereof, designed to perform the functions described herein. In practice, the data control module 112 includes processing logic that may be configured to carry out functions, techniques, and processing tasks described herein, and the steps of a method or algorithm described in connection with the embodiments disclosed herein may be embodied directly in hardware, in firmware, in a software module executed by the data control module 112, or in any practical combination thereof. In this regard, the data control module 112 may include or otherwise access a data storage element or any other non-transitory short or long term storage media or other computer-readable medium capable of storing programming instructions that, when read and executed by the data control module 112, cause the data control module 112 to perform the tasks, operations, functions, and processes described in more detail below.

The interrupt control module 120 generally represents the hardware, circuitry, logic and/or other components of the processing device 102 that are configured to receive interrupt servicing notifications from the data control module 112 and clear interrupt requests from the filtering modules 114, 116, 118 in a manner that ensures that the data control module 112 services interrupt requests generated by the filtering modules 114, 116, 118. The interrupt control module 120 may be implemented with or realized as a processing core, a microcontroller, a microprocessor, a content addressable memory, an application specific integrated circuit, a field programmable gate array, any suitable programmable logic device, discrete gate or transistor logic, discrete hardware components, or any combination thereof, designed to perform the functions described herein. In practice, the interrupt control module 120 includes processing logic that may be configured to carry out functions, techniques, and processing tasks described herein, and the steps of a method or algorithm described in connection with the embodiments disclosed herein may be embodied directly in hardware, in firmware, in a software module executed by the interrupt control module 120, or in any practical combination thereof. In this regard, the interrupt control module 120 may include or otherwise access a data storage element or any other non-transitory short or long term storage media or other computer-readable medium capable of storing programming instructions that, when read and executed by the interrupt control module 120, cause the interrupt control module 120 to perform the tasks, operations, functions, and processes described in more detail below. In some alternative embodiments, the features and/or functionality of the interrupt control module 120 may be integrated with the data control module 112, in which case, a separate interrupt control module 120 may not be present in a practical embodiment of the processing device 102.

Still referring to FIG. 1, in exemplary embodiments, the processing device 102 includes an arithmetic logic unit (ALU) 122 that is coupled to the data control module 112 and configured to calculate or otherwise determine calibrated measurement data based at least in part on filtered measurement data and corresponding processing algorithm coefficients provided by the data control module 112. The ALU 122 is configured to store the calibrated measurement data in one or more data storage elements, such as result registers 124, which are coupled to the ALU 122 and the data control module 112. In exemplary embodiments, the processing device 102 also includes one or more algorithm coefficient data storage elements 121 coupled to the data control module 112. The algorithm coefficient data storage elements 121 store or otherwise maintain processing algorithm coefficients (e.g., offset coefficients, sensitivity coefficients, temperature coefficients, trim codes, and the like) associated with the respective sensing arrangements 104, 106, 108 and/or the respective filtering modules 114, 116, 118 for use in calculating calibrated measurement data values based on filtered measurement data values obtained from the filtering modules 114, 116, 118. In exemplary embodiments, the algorithm coefficient data storage elements 121 are realized as a plurality of registers, with each register storing one or more processing coefficients associated with one or more of the sensing arrangements 104, 106, 108. For example, one or more algorithm coefficient registers 121 associated with the x-axis output of the acceleration sensing arrangement 104 may store an offset coefficient, a sensitivity coefficient, a temperature coefficient, a trim code, low pass filter coefficients, and/or the like for calculating a calibrated x-axis acceleration measurement value based on the filtered x-axis acceleration measurement value obtained from the x-axis accelerometer filtering module 114. In this regard, the signal processing algorithm performed on the filtered measurement values from a respective filtering module 114, 116, 118 is programmable or otherwise configurable by changing the algorithm coefficient values that are maintained in the algorithm coefficient register(s) 121.

In response to obtaining a filtered measurement value from a respective filtering module 114, 116, 118, the data control module 112 accesses the algorithm coefficient register(s) 121 associated with that filtered sensor measurement value to obtain the corresponding algorithm coefficients and provides the algorithm coefficients and the filtered sensor measurement value to the ALU 122 for further processing. In exemplary embodiments, the ALU 122 is configured to support or otherwise implement a closed-loop calibration processing algorithm, wherein an updated (or new) calibrated measurement value is determined based on a new measurement value and a previously-determined calibrated sensor measurement value. In this regard, in response to obtaining a filtered measurement value, the data control module 112 accesses the result registers 124 to obtain the previous calibrated measurement value corresponding to the filtered measurement value and provides the previous calibrated measurement value to the ALU 122 along with the algorithm coefficients and the filtered sensor measurement value. For example, in response to obtaining a new filtered x-axis acceleration measurement value from the x-axis accelerometer filtering module 114, the data control module 112 obtains the x-axis acceleration processing coefficients from the algorithm coefficient registers 121, obtains the previously-determined calibrated x-axis acceleration measurement value from the calibrated result registers 124, and provides the new filtered x-axis acceleration measurement value, the previously-determined calibrated x-axis acceleration measurement value, and the x-axis acceleration algorithm coefficients to the ALU 122. In response to receiving the new filtered x-axis acceleration measurement value, the previously-determined calibrated x-axis acceleration measurement value, and the x-axis acceleration algorithm coefficients, the ALU 122 calculates or otherwise determines a new (or updated) calibrated x-axis acceleration measurement value based on the new filtered x-axis acceleration measurement value, the previously-determined calibrated x-axis acceleration measurement value, and the x-axis acceleration algorithm coefficients. In exemplary embodiments, the ALU 122 stores or otherwise maintains the new calibrated x-axis acceleration measurement value in the calibrated result registers 124 by overwriting the previously-determined calibrated x-axis acceleration measurement value.

In exemplary embodiments, the ALU 122 is configured to apply a low-pass filter to the filtered measurement value based at least in part on the low-pass filtering coefficients from the algorithm coefficient registers 121 and the previously-determined calibrated measurement value. Thereafter, the ALU 122 utilizes the most recent temperature measurement value (obtained via the temperature sensing arrangement 108 and/or from a result register 124) along with the trim codes and/or coefficients, the offset compensation coefficients, temperature compensation coefficients, and the like that were obtained from the algorithm coefficient registers 121 to perform temperature compensation on the low-pass filtered measurement value and scale the temperature compensated low-pass filtered measurement value to obtain a new calibrated measurement value. The ALU 122 includes at least a multiply-accumulate (MAC) arrangement 126 and a division arrangement 128 configured to support the processing algorithms described herein. In accordance with one or more embodiments, the MAC arrangement 126 operates at a different clock frequency than the clock frequency of the division arrangement 128. For example, in one embodiment, the MAC arrangement 126 operates at a 2 megahertz (MHz) clock frequency while the division arrangement 128 operates at a 4 MHz clock frequency. In exemplary embodiments, the ALU 122 is configured to support a mixed number format comprised of one or more integer bits and one or more fractional bits. For example, in one embodiment, a low pass coefficient obtained by the data control module 112 from the algorithm coefficient registers 121 includes 26 bits of data, where a first bit of the coefficient data is a sign bit, a second bit of the coefficient data is an integer bit, and the remaining 24 bits of the coefficient data are fractional bits. In exemplary embodiments, the MAC arrangement 126 and/or the division arrangement 128 are configured to automatically saturate and round the measurement data values in a manner that is influenced by the algorithm coefficients. For example, in one or more embodiments, the numbering system used for the low-pass filtering coefficients indicates or otherwise causes the ALU 122 to implement a saturation and rounding scheme when determining low-pass filtered measurement values, where that saturation and rounding scheme is different from the saturation and rounding scheme subsequently implemented when determining temperature compensated measurement values based on those low-pass filtered measurement values. Additionally, the temperature compensation saturation and rounding scheme may be influenced by the numbering system for the temperature compensation coefficients.

In exemplary embodiments, after implementing the algorithm coefficient(s) on the sensor measurement value(s) obtained from the data control module 112, the ALU 122 stores or otherwise maintains the resulting calibrated measurement value in a result register 124 that corresponds to the particular sensing arrangement 104, 106, 108. For example, the calibrated x-axis acceleration measurement value may be stored in a result register 124 associated with the x-axis of the acceleration sensing arrangement 104. It should be noted that although the result registers 124 are depicted as being separate from the ALU 122, in practice, one or more of the result registers 124 may be integrated with the ALU 122. In such embodiments, a calibrated measurement value may be stored in a register 124 integrated with the ALU 122 (e.g., an ALU register) for quicker access within the ALU 122 and/or by the serial interface control module 110, with the calibrated measurement value also being stored in a result register 124 that is external to the ALU 122 for access by the data control module 112. In accordance with one or more embodiments, the result registers 124 operate at a different clock frequency than the clock frequency of the data control module 112 and/or the ALU 122. For example, in one embodiment, the result registers 124 operate at an 8 MHz clock frequency while the data control module 112, the interrupt control module 120, and the MAC arrangement 126 operate at a 2 MHz clock frequency and the division arrangement 128 operates at a 4 MHz clock frequency.

Still referring to FIG. 1, the serial interface control module 110 generally represents the hardware, circuitry, logic and/or other components of the processing device 102 that are configured to support communications to/from the serial interface 111 coupled to the processing device 102. For example, in response to receiving a request for a sensor measurement value from the serial interface 111, the serial interface control module 110 accesses the registers 124, either directly or indirectly via the ALU 122, to obtain the requested calibrated sensor measurement value and transmit or otherwise output that calibrated sensor measurement value via the serial interface 111. In this regard, the serial interface control module 110 may include or otherwise be coupled to one or more transceiver modules capable of supporting communications over the serial interface 111. In accordance with one or more embodiments, the serial interface control module 110 operates at a different clock frequency than the clock frequency of the data control module 112 and/or the ALU 122. For example, in one embodiment, the serial interface control module 110 operates at an 8 MHz clock frequency while the data control module 112, the interrupt control module 120, and the MAC arrangement 126 operate at a 2 MHz clock frequency and the division arrangement 128 operates at a 4 MHz clock frequency. In this regard, the registers 124 and the serial interface control module 110 may operate at a higher clock frequency to support the communications frequency of the serial interface 111 while the data control module 112, the interrupt control module 120, the MAC arrangement 126, and the division arrangement 128 operate at a lower clock frequency to reduce power and/or area requirements.

Figure 2:
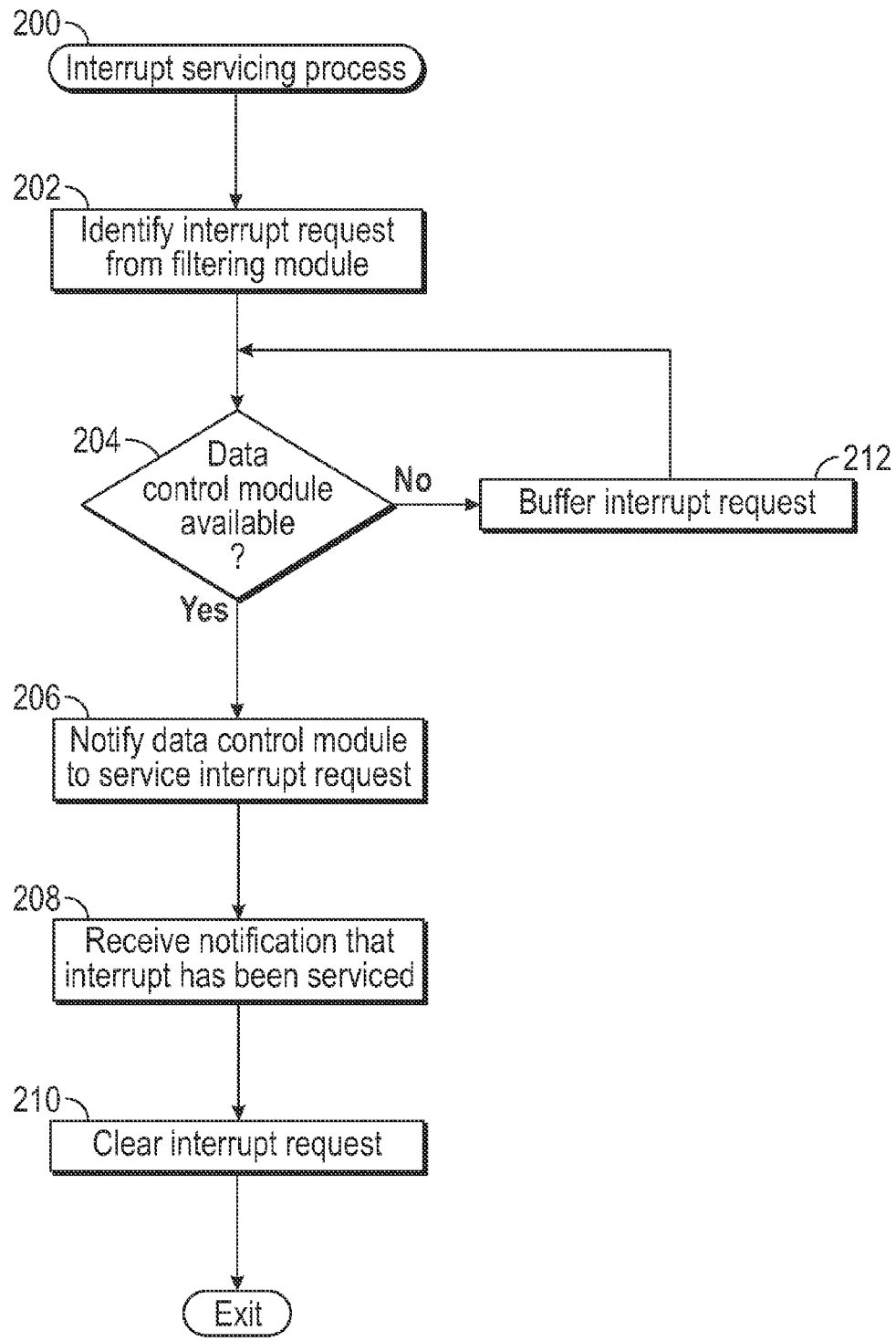
FIG. 2 is a flow diagram of an exemplary interrupt servicing process suitable for implementation by the processing device in the signal processing system of FIG. 1 in accordance with one or more embodiments of the invention.

FIG. 2 depicts an exemplary embodiment of an interrupt servicing process 200 suitable for implementation by a processing device, such as processing device 102, to process sensor data having different sampling frequencies associated therewith. The various tasks performed in connection with the illustrated process 200 may be performed by hardware, software and/or firmware executed by processing circuitry or other suitable hardware, or any combination thereof. For illustrative purposes, the following description of the interrupt servicing process 200 may refer to elements mentioned above in connection with FIG. 1, such as, for example, the data control module 112, the filtering modules 114, 116, 118, the interrupt control module 120, the ALU 122, the registers 124, the MAC arrangement 126 and/or the division arrangement 128. It should be appreciated that the interrupt servicing process 200 may include any number of additional or alternative tasks, the tasks need not be performed in the illustrated order and/or the tasks may be performed concurrently, and/or the interrupt servicing process 200 may be incorporated into a more comprehensive procedure or process having additional functionality not described in detail herein. Moreover, one or more of the tasks shown and described in the context of FIG. 2 could be omitted from a practical embodiment of the interrupt servicing process 200 as long as the intended overall functionality remains intact.

Referring to FIG. 2, and with continued reference to FIG. 1, in exemplary embodiments, the interrupt servicing process 200 initializes or otherwise begins in response to receiving or otherwise identifying an interrupt request from a filtering module (task 202). As described above, the filtering modules 114, 116, 118 receive or otherwise obtain sensor measurement values from the respective sensing arrangements 104, 106, 108 at the sampling frequency of the respective sampling arrangements 103, 105, 107, utilize one or more filtering coefficients obtained from the filter coefficient registers 113 to apply filters to the sensor measurement values, and generate interrupt requests after obtaining filtered sensor measurement values. For example, the respective filtering modules 114 associated with the x-, y-, and z-axes of the acceleration sensing arrangement 104 receive or otherwise obtain x-, y-, and z-axis sensor measurement values from the acceleration sensing arrangement 104, utilize one or more filtering coefficients from the filter coefficient registers 113 to apply decimating sinc filters to the x-, y-, and z-axis sensor measurement values, and generate interrupt requests after obtaining the respective filtered x-, y-, and z-axis sensor measurement values. For example, after obtaining a new x-axis acceleration measurement value from the x-axis acceleration sensing arrangement 104 via a sampling arrangement 103 and applying the accelerometer x-axis filter coefficients from the filter coefficient registers 113 to the new x-axis acceleration measurement value to determine a new filtered x-axis acceleration measurement value, the accelerometer x-axis filtering module 114 automatically sets the interrupt bit to provide an indication (e.g., a logic '1' or another logical high signal) of the new filtered x-axis acceleration measurement value. In this regard, the interrupt control module 120 may continuously and/or periodically monitor the interrupt output bits of the filtering modules 114, 116, 118 to detect or otherwise identify new interrupt requests in response to chances in the interrupt output bit of a respective filtering module 114, 116, 118 from one logic state (e.g., logic '0' or another logical low signal) to another logic state associated with an interrupt request (e.g., logic '1').

After identifying an interrupt request, the interrupt servicing process 200 continues by identifying or otherwise determining whether the data control module is available to service the interrupt request (task 204). As described above, the interrupt control module 120 is coupled to the filtering modules 114, 116, 118 to receive, obtain, or otherwise identify the interrupt requests generated by the filtering modules 114, 116, 118, and in response, the interrupt control module 120 accesses the data control module 112 to determine or otherwise identify whether the data control module 112 is available to service the interrupt request. For example, the interrupt control module 120 may poll or otherwise access a flag bit output by the data control module 112, wherein the state of the flag bit that indicates whether the data control module 112 is currently servicing an interrupt request (e.g., a logic '1' or another logical high signal) or whether the data control module 112 is available to service an interrupt request (e.g., a logic '0' or another logical low signal).

When the data control module is available to service the interrupt request, the interrupt servicing process 200 continues by instructing, commanding, or otherwise notifying the data control module to service the interrupt request (task 206). In this regard, the interrupt control module 120 may provide a notification or command to the data control module 112 that identifies the filtering module 114, 116, 118 having a filtered sensor measurement value to be serviced. For example, in response to receiving an interrupt request generated by the filtering module 114 associated with the x-axis of the acceleration sensing arrangement 104 (e.g., by identifying the interrupt bit of the accelerometer x-axis filtering module 114 is equal to logic '1'), the interrupt control module 120 accesses the flag bit of the data control module 112 to determine whether the data control module 112 is available. In response to determining that the data control module 112 is available to service the interrupt request (e.g., when the flag bit is '0'), the interrupt control module 120 provides a command, instruction, or other notification to the data control module 112 that the accelerometer x-axis filtering module 114 is ready for servicing. In response to receiving the notification from the interrupt control module 120, the data control module 112 accesses the identified filtering module 114, 116, 118 to obtain the new filtered sensor measurement value and continues servicing the request by obtaining the algorithm coefficient(s) associated with the obtained filtered sensor measurement value from the algorithm coefficient registers 121, obtaining a previously-determined calibrated sensor measurement value, and providing the new filtered sensor measurement value, the previously-determined calibrated sensor measurement value, and the algorithm coefficient(s) to the ALU 122 for further processing. For example, in response to receiving the notification from the interrupt control module 120 that the accelerometer x-axis filtering module 114 is ready for servicing, the data control module 112 automatically obtains the new filtered x-axis acceleration measurement value from the accelerometer x-axis filtering module 114, obtains the algorithm coefficient(s) associated with the accelerometer x-axis from the algorithm coefficient registers 121, obtains a previously-determined calibrated x-axis acceleration measurement value from the result registers 124, and provides the new filtered x-axis acceleration measurement value, the previously-determined calibrated x-axis acceleration measurement value, and the accelerometer x-axis algorithm coefficient(s) to the ALU 122 for further processing. In this regard, the ALU 122 automatically processes the new filtered x-axis acceleration measurement value using the previously-determined calibrated x-axis acceleration measurement value and the accelerometer x-axis algorithm coefficient(s) to determine a new calibrated x-axis acceleration measurement value that is stored in the appropriate result register 124 as described above. In exemplary embodiments, after providing the new filtered measurement value obtained from a filtering module 114, 116, 118, the data control module 112 generates or otherwise provides a notification or another indication to the interrupt control module 120 that the interrupt has been serviced. In this regard, the notification provided by the data control module 112 may identify the filtering module 114, 116, 118 that was serviced.

In exemplary embodiments, the interrupt servicing process 200 continues by receiving or otherwise identifying the notification that the interrupt request has been serviced and clearing the interrupt request in response to receiving the service notification (tasks 208, 210). In this regard, in response to receiving a notification from the data control module 112 that the filtered sensor measurement value has been obtained by a filtering module 114, 116, 118, the interrupt control module 120 automatically signals or otherwise instructs the filtering module 114, 116, 118 to clear the interrupt request. For example, after servicing the accelerometer x-axis filtering module 114, the data control module 112 may provide a notification to the interrupt control module 120 that the accelerometer x-axis filtering module 114 has been serviced, and in response to receiving the notification, the interrupt control module 120 automatically signals, commands, or otherwise instructs the accelerometer x-axis filtering module 114 to clear the interrupt request by setting the interrupt output bit to indicate the interrupt request has been serviced (e.g., a logic '0' interrupt bit).

Still referring to FIG. 2, in exemplary embodiments, the interrupt servicing process 200 repeats throughout operation of the processing device 102 to ensure that all of the sensor measurement values generated or otherwise provided by the sensing arrangements 104, 106, 108 are processed or otherwise serviced by the processing device 102. In this regard, in response to identifying or otherwise determining the data control module is unavailable to service an interrupt request (task 204), the interrupt servicing process 200 buffers or otherwise maintains the interrupt request for handling when the data control module is subsequently available to service the interrupt request (task 212). For example, after obtaining a new x-axis orientation measurement from the x-axis sensing element of the gyroscopic sensing arrangement 106 and applying the gyroscope x-axis filter coefficients from the filter coefficient registers 113 to the x-axis orientation measurement to determine a new filtered x-axis orientation measurement value, the gyroscope x-axis filtering module 116 automatically sets its interrupt bit to a state that indicates the new filtered x-axis orientation measurement value is available for servicing. In response to identifying the interrupt request from the gyroscope x-axis filtering module 116, the interrupt control module 120 accesses the flag bit of the data control module 112 to determine whether the data control module 112 is available to service the interrupt request. When the flag bit of the data control module 112 indicates the data control module 112 is busy servicing the new filtered x-axis acceleration measurement value, the interrupt control module 120 determines the data control module 112 is unavailable for servicing the interrupt request and buffers or otherwise maintains the interrupt request for subsequent handling. In this regard, the interrupt control module 120 adds or otherwise inserts the interrupt request into a buffer, a queue or another suitable data structure, so that the interrupt control module 120 can notify the data control module 112 to service the buffered interrupt request in response to receiving notification that the data control module 112 is done servicing a preceding interrupt request. For example, the interrupt control module 120 may implement or otherwise maintain a first in first out (FIFO) queue or another similar data structure that ensures that interrupt requests are serviced in the order in which they were generated. In other embodiments, the interrupt control module 120 may implement or otherwise provide arbitration logic for determining the order in which buffered interrupt requests should be provided to the data control module 112 and selecting the buffered interrupt request to be serviced next based on various selection criteria, such as, for example, the relative sampling frequency for the sensing arrangement 104, 106, 108 associated with the respective interrupt request. For example, as described above, in one embodiment, the sampling frequency associated with the acceleration sensing arrangement 104 may be on the order of about twice the sampling frequency of the gyroscopic sensing arrangement 106, such that the acceleration filtering modules 114 generate interrupt requests at substantially twice the rate as the gyroscope filtering modules 116, and accordingly, the interrupt control module 120 may analyze various selection criteria to ensure that interrupt requests generated by the acceleration sensing arrangement 104 are not accumulated disproportionately by virtue of the higher sampling frequency.

After receiving a notification from the data control module 112 that the data control module 112 has finished servicing a previous interrupt request and is now available, the interrupt control module 120 selects, identifies, or otherwise determines the buffered interrupt request to be serviced next and provides a notification or command to the data control module 112 that identifies the filtering module 114, 116, 118 associated with the buffered interrupt request to be serviced. For example, after receiving a notification from the data control module 112 that the filtered x-axis acceleration measurement value has been serviced, the interrupt control module 120 may determine or otherwise identify the x-axis orientation measurement value as the next measurement value to be serviced (e.g., based on the interrupt request from the gyroscope x-axis filtering module 116 being the oldest interrupt request in a FIFO buffer) and provide a notification to the data control module 112 that the gyroscope x-axis filtering module 116 should be serviced. In response to receiving the notification from the interrupt control module 120, the data control module 112 automatically obtains the filtered x-axis orientation measurement value from the gyroscope x-axis filtering module 116, obtains the previously-determined calibrated x-axis orientation measurement value from the registers 124, obtains the algorithm coefficient(s) associated with the gyroscope x-axis from the algorithm coefficient registers 121, and provides the filtered x-axis orientation measurement value, the calibrated x-axis orientation measurement value, and the gyroscope x-axis algorithm coefficient(s) to the ALU 122 for further processing. Thereafter, the data control module 112 generates or otherwise provides a notification or another indication to the interrupt control module 120 that the gyroscope x-axis filtering module 116 has been serviced, and in response, the interrupt control module 120 may automatically signal or otherwise instruct the gyroscope x-axis filtering module 116 to clear the interrupt request (e.g., by setting the interrupt output bit to logic '0'). Additionally, the interrupt control module 120 may delete or otherwise remove the buffered interrupt request associated with the gyroscope x-axis filtering module 116 after receiving the notification that it has been serviced from the data control module 112. In this manner, an interrupt request may be buffered or otherwise maintained until its servicing is confirmed by the data control module 112, thereby ensuring that all interrupt requests are serviced before being removed from the buffer.

Figure 3:
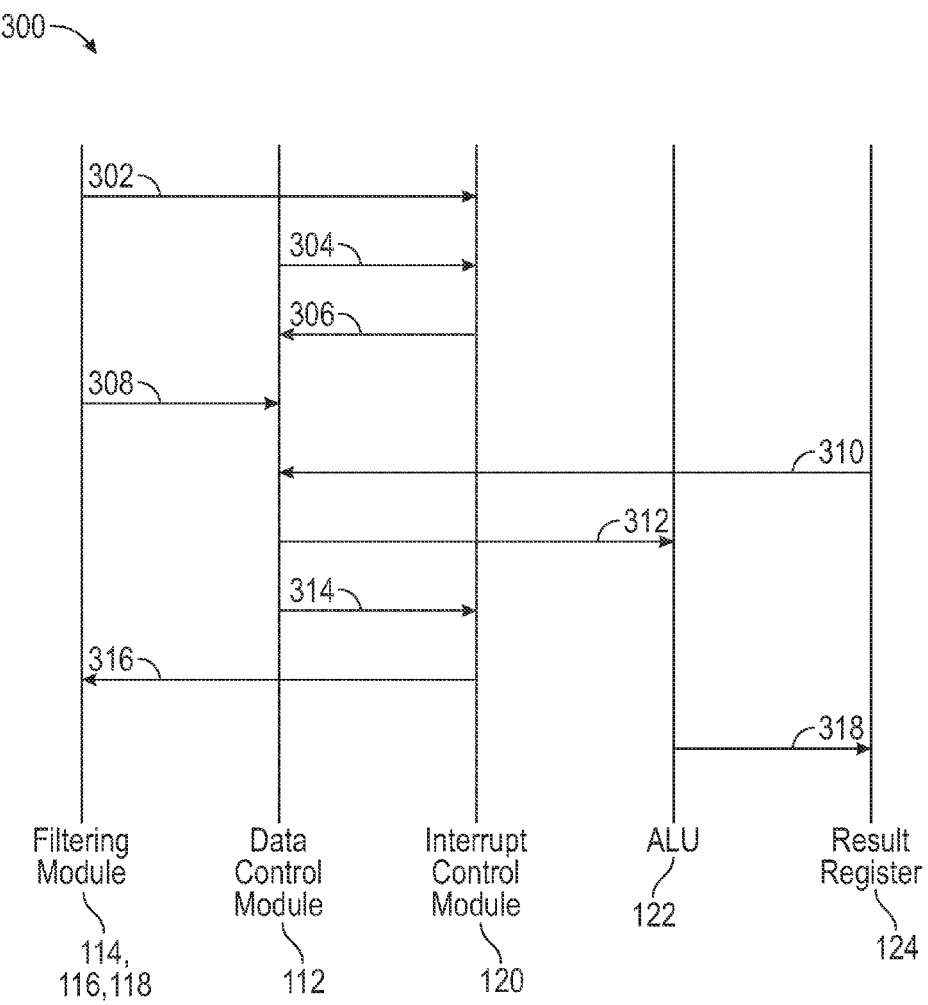
FIG. 3 is a diagram illustrating a sequence of communications within the processing device of FIG. 1 in accordance with one exemplary embodiment of the interrupt servicing process of FIG. 2.

FIG. 3 depicts an exemplary sequence 300 of communications within the processing device 102 in accordance with one exemplary embodiment of the interrupt servicing process 200 of FIG. 2. As described above, a respective filtering module 114, 116, 118 receives a sensor measurement value from its associated sensing arrangement 104, 106, 108, filters the sensor measurement value using one or more filtering coefficients from the filter coefficient registers 113 associated with the respective sensor measurement, and generates or otherwise provides an interrupt request that indicates a new filtered sensor measurement value is available for processing. The interrupt control module 120 monitors the interrupt output of the respective filtering module 114, 116, 118, and in response to identifying 302 the interrupt request, the interrupt control module 120 determines or otherwise identifies 304 whether the data control module 112 is available to service the interrupt request. As described above, when the data control module 112 is unavailable to service a new interrupt request, the interrupt control module 120 buffers, queues, or otherwise maintains the interrupt request until the data control module 112 is available. In this regard, the interrupt request may be maintained along with interrupt requests associated with other filtering modules 114, 116, 118 and/or sensing arrangements 104, 106, 108 when there are multiple filtering modules 114, 116, 118 and/or sensing arrangements 104, 106, 108 operating at different frequencies and independently of one another. In such embodiments, the interrupt control module 120 may have the buffered interrupt requests serviced in a first in first out manner, or alternatively, utilize one or more servicing criteria to determine which buffered interrupt requests should be given priority and handled first once the data control module 112 becomes available.

In the illustrated embodiment, when the data control module 112 is available to service the interrupt request, the interrupt control module 120 instructs or otherwise notifies 306 the data control module 112 to service the interrupt request. In response to receiving the notification from the interrupt control module 120, the data control module 112 obtains 308 the new filtered sensor measurement value from the identified filtering module 114, 116, 118 and obtains 310 the corresponding calibrated sensor measurement value from the registers 124. The data control module 112 also obtains the algorithm coefficient(s) associated with the obtained filtered sensor measurement value from the algorithm coefficient registers 121 and continues servicing the request by providing 312 the new filtered sensor measurement value, the calibrated sensor measurement value, the algorithm coefficient(s) and/or any other data or instructions for the processing algorithms to the ALU 122. After obtaining the filtered sensor measurement value and providing it to the ALU 122, the data control module 112 generates or otherwise provides 314 a notification or another indication to the interrupt control module 120 that the interrupt has been serviced, and in response, the interrupt control module 120 automatically signals or otherwise instructs 316 the filtering module 114, 116, 118 to clear the interrupt request.

As described above, the ALU 122 utilizes the algorithm coefficient(s) and the calibrated sensor measurement value to low-pass filter the new filtered sensor measurement value and perform trimming and/or temperature compensation, scaling, saturation, rounding, and the like to obtain a new calibrated sensor measurement value, which is stored 318 in a result register 124 associated with the particular sensor measurement value (e.g., the register 124 associated with the x-axis accelerometer output). Thereafter, the resultant calibrated sensor measurement value may be obtained from the result register 124 by the serial interface control module 110 and transmitted or otherwise provided to an external device or system via the serial interface 111.

To briefly summarize, one advantage of the subject matter described above is that the output from multiple different sensing arrangements having different sampling (or operating) frequencies can be processed using reduced clock frequencies and/or with a reduced amount of software overhead that would otherwise be required to ensure that all of the sensor samples are processed without being missed or otherwise dropped when samples from different sensing arrangements occur simultaneously and/or when another sample is being processed. As a result, the power and/or area requirements may be reduced. Although various example sampling frequencies have been indicated, above, it is to be understood that, in alternate embodiments, the sampling frequencies of the various sensing arrangements 104, 106, 108 and/or the relative differences between the sampling frequencies may be lower or higher than the values or ranges discussed herein. Similarly, although various example clock frequencies have been indicated, above, it is to be understood that, in alternate embodiments, the clock frequencies of clocks provided to the various modules and/or the relative differences between the clock frequencies may be lower or higher than the values or ranges discussed herein.

For the sake of brevity, conventional techniques related to signal processing, sampling, sensing, analog-to-digital conversion, sensor calibration and/or compensation, computer architecture, and other functional aspects of the subject matter may not be described in detail herein. In addition, certain terminology may also be used herein for the purpose of reference only, and thus are not intended to be limiting. For example, the terms "first", "second" and other such numerical terms referring to structures do not imply a sequence or order unless clearly indicated by the context. The foregoing description may also refer to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although a schematic shown in the figures may depict direct connections between elements, alternative embodiments may employ intervening elements and/or components while functioning in a substantially similar manner.

In conclusion, systems, devices, and methods configured in accordance with example embodiments of the invention relate to:

An apparatus for a device is provided. The device comprises a first module to provide data and an interrupt, a data control module coupled to the first module to obtain the data from the first module and provide an indication after obtaining the data, and an interrupt control module coupled to the first module and the data control module to notify the first module to clear the interrupt in response to the indication from the data control module. In one embodiment, the device further comprises a second module to provide second data and a second interrupt. The interrupt control module is coupled to the second module to buffer the second interrupt and provide an instruction to the data control module to obtain the second data after receiving the indication from the data control module, and the data control module is coupled to the second module to obtain the second data from the second module in response to the instruction. In a further embodiment, the data control module provides a second indication after obtaining the second data and the interrupt control module notifies the second module to clear the second interrupt in response to receiving the second indication from the data control module. In another embodiment, a first sampling frequency associated with the data is different from a second sampling frequency associated with the second data. In a further embodiment, the data comprises a first filtered measurement value determined based on a first sensor measurement value obtained from a first sensing arrangement having the first sampling frequency, and the second data comprises a second filtered measurement value determined based on a second sensor measurement value obtained from a second sensing arrangement having the second sampling frequency.

In one embodiment, the device further comprises a second module to provide second data and a second interrupt. The data control module is coupled to the second module to obtain the second data from the second module and provide a second indication after obtaining the second data, and the interrupt control module is coupled to the second module and the data control module to notify the second module to clear the second interrupt in response to receiving the second indication from the data control module. In one embodiment, a first sampling frequency associated with the data is different from a second sampling frequency associated with the second data. In another embodiment, the data comprises a first filtered measurement value determined based on a first sensor measurement value obtained from a first sensing arrangement and the second data comprises a second filtered measurement value determined based on a second sensor measurement value obtained from a second sensing arrangement.

In another embodiment, the device further comprises an arithmetic logic unit coupled to the data control module to determine calibrated data based at least in part on the data, wherein the data control module is configured to provide the indication after providing the data to the arithmetic logic unit. In one embodiment, the arithmetic logic unit includes one or more arithmetic arrangement, and a clock frequency associated with the one or more arithmetic arrangements is different from a clock frequency associated with the data control module. In another embodiment, the device further comprises a serial interface control module to obtain the calibrated data and output the calibrated data via a serial interface, wherein a clock frequency associated with the serial interface control module is different from a clock frequency associated with the data control module. In one embodiment, a clock frequency associated with the data control module is different from a sampling frequency associated with the data.

An exemplary method of processing measurement data is also provided. The measurement data is based at least in part on output from a sensing arrangement, wherein the method comprises an interrupt control module determining whether the measurement data associated with an interrupt generated by a first module has been serviced by a data control module and notifying the first module to clear the interrupt in response to determining the interrupt has been serviced. In one embodiment, the method further comprises buffering, by the interrupt control module, the interrupt in response to determining the data control module is unavailable to service the interrupt, and thereafter providing, by the interrupt control module, a notification to the data control module to service the interrupt after determining the data control module is available to service the interrupt. In a further embodiment, the data control module obtains the measurement data from the first module after the notification and generates an indication after obtaining the measurement data, wherein determining whether the measurement data associated with the interrupt has been serviced comprises the interrupt control module identifying the indication generated by the data control module. In another embodiment, the method further comprises the interrupt control module identifying a second interrupt generated by a second module, determining whether the data control module is available to service the second interrupt, buffering the second interrupt in response to determining the data control module is unavailable to service the second interrupt, and providing a notification to the data control module to service the second interrupt after determining the measurement data associated with the interrupt generated by the first module has been serviced by the data control module. In a further embodiment, the data control module obtains second measurement data from the second module after the notification and generates a second indication after obtaining the second measurement data, the second measurement data being based at least in part on second output from a second sensing arrangement, wherein the method further comprises the interrupt control module determining the second measurement data associated with the second interrupt has been serviced in response to identifying the second indication and notifying the second module to clear the second interrupt in response to determining the second interrupt has been serviced.

In another exemplary embodiment, a signal processing system is provided. The signal processing system comprises a plurality of sensing arrangements to provide measurement data indicative of a respective characteristic sensed by a respective sensing arrangement and a processing device. The processing device comprises a plurality of filtering modules, a data control module, and an interrupt control module. Each filtering module of the plurality is coupled to a respective sensing arrangement of the plurality of sensing arrangements to generate an interrupt and a filtered measurement value associated with the interrupt based at least in part on the respective measurement data from the respective sensing arrangement. The data control module is coupled to the plurality of filtering modules to obtain filtered measurement values from the plurality of filtering modules and provide indications after obtaining the filtered measurement values. The interrupt control module is coupled to the plurality of filtering modules and the data control module to notify the respective filtering modules to clear the respective interrupts in response to the indications from the data control module. In one embodiment, the plurality of sensing arrangements operate at different sampling frequencies. In another embodiment, the plurality of sensing arrangements include a first sensing arrangement to provide first measurement data indicative of a first characteristic sensed by the first sensing arrangement and a second sensing arrangement to provide second measurement data indicative of a second characteristic sensed by the second sensing arrangement. The plurality of filtering modules include a first filtering module coupled to the first sensing arrangement to generate a first interrupt and a first filtered measurement value associated with the first interrupt based at least in part on the first measurement data and a second filtering module coupled to the second sensing arrangement to generate a second interrupt and a second filtered measurement value associated with the second interrupt based at least in part on the second measurement data. The data control module is coupled to the first filtering module to obtain the first filtered measurement value from the first filtering module and provide a first indication after obtaining the first filtered measurement value. The interrupt control module is coupled to the first filtering module and the second filtering module to buffer the second interrupt and, in response to the first indication from the data control module, notify the first filtering module to clear the first interrupt and instruct the data control module to obtain the second filtered measurement value from the second filtering module.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A device comprising:
   a first filtering module to provide a first interrupt and a first filtered measurement value associated with the first interrupt;
   a second filtering module to provide a second interrupt and a second filtered measurement value associated with the second interrupt;
   a data control module coupled to the first filtering module and the second filtering module to obtain the first filtered measurement value from the first filtering module, provide an indication after obtaining the first filtered measurement value, and obtain the second filtered measurement value from the second filtering module in response to an instruction; and
   an interrupt control module coupled to the first filtering module, the second filtering module, and the data control module to buffer the second interrupt, notify the first filtering module to clear the first interrupt in response to the indication from the data control module, and provide the instruction to the data control module to obtain the second filtered measurement value after receiving the indication from the data control module, wherein:
      the first filtered measurement value is determined based on a first sensor measurement value indicative of a first characteristic sensed by a first sensing arrangement and having a first sampling frequency;
      the second filtered measurement value is determined based on a second sensor measurement value indicative of a second characteristic sensed by a second sensing arrangement and having a second sampling frequency; and
      the first sampling frequency is different from the second sampling frequency.

2. The device of claim 1, wherein the data control module provides a second indication after obtaining the second filtered measurement value and the interrupt control module notifies the second filtering module to clear the second interrupt in response to receiving the second indication from the data control module.

3. The device of claim 1, wherein:
   the data control module is configured provide a second indication after obtaining the second filtered measurement value; and
   the interrupt control module is configured to notify the second filtering module to clear the second interrupt in response to receiving the second indication from the data control module.

4. The device of claim 1, further comprising an arithmetic logic unit coupled to the data control module to determine calibrated data based at least in part on the first filtered measurement value, wherein the data control module is configured to provide the indication after providing the first filtered measurement value to the arithmetic logic unit.

5. The device of claim 4, wherein:
   the arithmetic logic unit includes one or more arithmetic arrangements; and
   a clock frequency associated with the one or more arithmetic arrangements is different from a clock frequency associated with the data control module.

6. The device of claim 4, further comprising a serial interface control module to obtain the calibrated data and output the calibrated data via a serial interface, wherein a clock frequency associated with the serial interface control module is different from a clock frequency associated with the data control module.

7. The device of claim 1, wherein a clock frequency associated with the data control module is different from the first sampling frequency associated with the first filtered measurement value.

8. A method of processing measurement data, the method comprising:
   identifying, by an interrupt control module, a second interrupt generated by a second filtering module;
   determining, by the interrupt control module, whether a data control module is available to service the second interrupt;
   buffering, by the interrupt control module, the second interrupt in response to determining the data control module is unavailable to service the second interrupt;
   determining, by the interrupt control module, whether a first filtered measurement value associated with a first interrupt generated by a first filtering module has been serviced by the data control module; and
   notifying, by the interrupt control module, the first filtering module to clear the first interrupt in response to determining the first interrupt has been serviced; and
   providing, by the interrupt control module, a notification to the data control module to service the second interrupt after determining the first filtered measurement value associated with the first interrupt generated by the first filtering module has been serviced by the data control module, wherein
   the first filtered measurement value is determined based on a first sensor measurement value obtained from a first sensing arrangement having a first sampling frequency;
   a second filtered measurement value associated with the second interrupt is determined based on a second sensor measurement value obtained from a second sensing arrangement having a second sampling frequency; and
   the first sampling frequency associated with the first filtered measurement value is different from the second sampling frequency associated with the second filtered measurement value.

9. The method of claim 8, further comprising:
   buffering, by the interrupt control module, the first interrupt in response to determining the data control module is unavailable to service the first interrupt; and
   thereafter providing, by the interrupt control module, a notification to the data control module to service the first interrupt after determining the data control module is available to service the first interrupt.

10. The method of claim 9, the data control module obtaining the first measurement data from the first filtering module after the notification and generating an indication after obtaining the first measurement data, wherein determining whether the measurement data associated with the first interrupt has been serviced comprises the interrupt control module identifying the indication generated by the data control module.

11. The method of claim 8, wherein the data control module obtains the second measurement data from the second filtering module after the notification and generates a second indication after obtaining the second measurement data, the second measurement data being based at least in part on second output from the second sensing arrangement, wherein the method further comprises:

determining, by the interrupt control module, the second measurement data associated with the second interrupt has been serviced in response to identifying the second indication; and notifying, by the interrupt control module, the second filtering module to clear the second interrupt in response to determining the second interrupt has been serviced.

12. A signal processing system comprising:
a first sensing arrangement to provide first measurement data indicative of a first characteristic sensed by the first sensing arrangement;
a second sensing arrangement to provide second measurement data indicative of a second characteristic sensed by the second sensing arrangement, wherein a first sampling frequency associated with the first measurement data is different from a second sampling frequency associated with the second measurement data;
a first filtering module coupled to the first sensing arrangement to generate a first interrupt and a first filtered measurement value associated with the first interrupt based at least in part on the first measurement data;
a second filtering module coupled to the second sensing arrangement to generate a second interrupt and a second filtered measurement value associated with the second interrupt based at least in part on the second measurement data;
a data control module coupled to the first filtering module and the second filtering module to:
 obtain the first filtered measurement value from the first filtering module; and
 provide a first indication after obtaining the first filtered measurement value; and
an interrupt control module is coupled to the first filtering module and the second filtering module to:
 buffer the second interrupt; and
 in response to the first indication from the data control module:
  notify the first filtering module to clear the first interrupt; and
  instruct the data control module to obtain the second filtered measurement value from the second filtering module.

13. The signal processing system of claim 12, wherein the data control module provides a second indication after obtaining the second measurement data and the interrupt control module notifies the second filtering module to clear the second interrupt in response to receiving the second indication from the data control module.

14. The signal processing system of claim 12, wherein:
the data control module is configured provide a second indication after obtaining the second measurement data; and
the interrupt control module is configured to notify the second filtering module to clear the second interrupt in response to receiving the second indication from the data control module.

15. The signal processing system of claim 12, further comprising an arithmetic logic unit coupled to the data control module to determine calibrated data based at least in part on the first measurement data, wherein the data control module is configured to provide the first indication after providing the first measurement data to the arithmetic logic unit.

16. The signal processing system of claim 15, wherein:
the arithmetic logic unit includes one or more arithmetic arrangements; and
a clock frequency associated with the one or more arithmetic arrangements is different from a clock frequency associated with the data control module.

17. The signal processing system of claim 15, further comprising a serial interface control module to obtain the calibrated data and output the calibrated data via a serial interface, wherein a clock frequency associated with the serial interface control module is different from a clock frequency associated with the data control module.

18. The signal processing system of claim 12, wherein a clock frequency associated with the data control module is different from the first sampling frequency and the second sampling frequency.

\* \* \* \* \*